US006684810B2

United States Patent
Martin

(10) Patent No.: US 6,684,810 B2
(45) Date of Patent: Feb. 3, 2004

(54) METHOD AND INSTALLATION FOR IDENTIFYING ANIMALS

(75) Inventor: Jacques Georges Martin, Dardilly (FR)

(73) Assignee: Farmexpress.Com SA, Brussels (BE)

( * ) Notice: Subject to any disclaimer, the term of this patent is extended or adjusted under 35 U.S.C. 154(b) by 0 days.

(21) Appl. No.: 10/168,106

(22) PCT Filed: Dec. 14, 2000

(86) PCT No.: PCT/FR00/03538

§ 371 (c)(1),
(2), (4) Date: Oct. 18, 2002

(87) PCT Pub. No.: WO01/45037

PCT Pub. Date: Jun. 21, 2001

(65) Prior Publication Data

US 2003/0051678 A1 Mar. 20, 2003

(30) Foreign Application Priority Data

Dec. 17, 1999 (FR) .............................................. 99 15936

(51) Int. Cl.[7] .................................................. A01K 1/10
(52) U.S. Cl. .................................... 119/51.02; 119/712
(58) Field of Search ............................. 119/712, 51.02

(56) References Cited

U.S. PATENT DOCUMENTS

| | | | | |
|---|---|---|---|---|
| 4,617,876 A | * | 10/1986 | Hayes | 119/842 |
| 4,854,328 A | * | 8/1989 | Pollack | 600/549 |
| 5,028,918 A | * | 7/1991 | Giles et al. | 340/10.51 |
| 5,055,659 A | * | 10/1991 | Hendrick et al. | 340/10.51 |
| 5,315,505 A | * | 5/1994 | Pratt et al. | 600/300 |
| 5,324,925 A | | 6/1994 | Koenck et al. | |
| 5,424,957 A | * | 6/1995 | Kerkhoff et al. | 700/240 |
| 5,455,575 A | | 10/1995 | Schuermann | |
| 5,499,626 A | | 3/1996 | Willham et al. | |
| 5,751,246 A | | 5/1998 | Hertel | |
| 5,790,047 A | * | 8/1998 | Golan | 340/10.42 |
| 5,791,294 A | * | 8/1998 | Manning | 119/721 |
| 5,832,488 A | * | 11/1998 | Eberhardt | 707/10 |
| 5,996,529 A | * | 12/1999 | Sissom et al. | 119/14.14 |
| 6,012,415 A | * | 1/2000 | Linseth | 119/174 |
| 6,211,789 B1 | * | 4/2001 | Oldham et al. | 340/573.3 |
| 6,342,839 B1 | * | 1/2002 | Curkendall et al. | 340/573.3 |

FOREIGN PATENT DOCUMENTS

| WO | WO 98/41084 | 9/1998 |
|---|---|---|
| WO | WO 99/45761 | 9/1999 |

* cited by examiner

Primary Examiner—Charles T. Jordan
Assistant Examiner—Jordan M Lofdahl
(74) Attorney, Agent, or Firm—Young & Thompson

(57) ABSTRACT

A method and an installation for identifying animals and managing data concerning animals so as to control the traceability of the animals and of the data. The installation includes an identifier (1) borne by the animal; a system for reading (2) the identifier; a self-contained system (3) for communicating with the user, processing and storing in a storage unit (7) data concerning at least an animal, a link between the self-contained system (3) and the reading system (2); a centralised database (4) assembling data concerning the animals; databases concerning data on the animals are included in the self-contained system storage unit and duplicated in the centralised data bank; device for communicating data between the self-contained system (3) and the centralised database (4) and communication means (6) and (6') between the self-contained system (3) and another self-contained system (3').

20 Claims, 1 Drawing Sheet

METHOD AND INSTALLATION FOR IDENTIFYING ANIMALS

Figure 1:
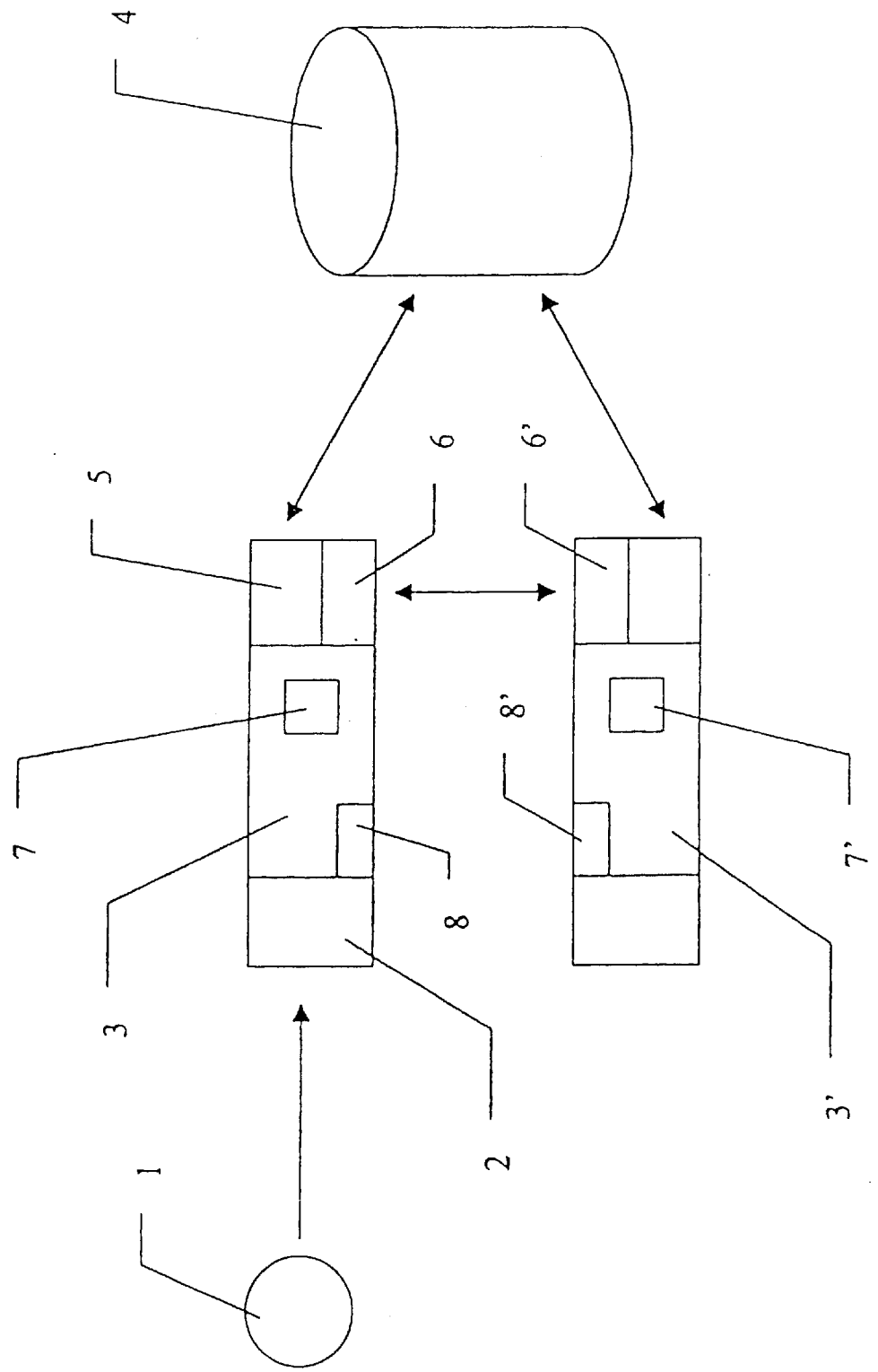

The present invention relates to a process and an installation permitting identifying animals and managing the information and occurrences relating to these animals with a view to controlling the traceability of the animals and the information.

This information concerning data relative to the life of the animal such as for example its date and place of birth, its breed, its different owners or holders, its movements, its illnesses or any other information and occurrences such as for example veterinary treatment, data relative to its physical condition, etc. . . .

The desire for traceability, origin and stages of the life of an animal is particularly prominent in recent years particularly as to cattle, these being but one instance of the application of the invention which can also relate to sheep, swine or any other type of animal from the moment at which the animal is provided with an identification means.

Current usage to ensure following the animals is visual identification associated with a paper passport. In certain applications, the data concerning the animal can be stored in national or regional databases. The paper passport must in theory follow all the movements of the animal and carry up to date data concerning it.

The use of a paper support gives rise to considerable problems, particularly because of the need to write manually on the passport the data concerning the animal. On the other hand, in use, the condition of the paper support degrades very rapidly and renders difficult any reading and automatic procedure. Finally, the connection with databases requires recording these data on a computer support such as a minitel for example to communication with the centralized database.

WO99/45761 provides a method and installation to collect information on the livestock and a system of managing this information from its inception to its consumption as to quality of the meat.

This patent is based on the use of identification elements carried by the animal, preferably of the radio frequency type, the use of a mobile reader adapted to different types of radio frequency transponders, adapted to be used along a path the animal is required to follow.

This radio frequency reader has the advantage of being wireless. This patent describes a system in which the data received by the reader can be communicated to dedicated databases, for example that of the breeder, that of the feeder, that of the slaughterer, that of the butcher . . . these data can be communicated to a central database.

In this patent, the reader is associated with a transponder card, each being dedicated to a particular occurrence which will be read by the reader. These data are transmitted to a multiport system which collects information from the reader.

The multiport system, independent from the reader, can, by ports dedicated to a specific type of occurrence, receive supplemental information communicated by the personnel who will use it, for example the cattle raiser.

These data taken from the reader or introduced into the multiport system are communicated to a central computer preferably radio frequency. This central computer can be disposed on an Internet network and communicate with other databases.

This system and the device for practicing it are particularly complicated. They suppose, other than reading the identification, the work of introducing data, either by reading of the dedicated transponder card, or by selection of a dedicated port.

The information is readable on a computer designed as a fixed or movable unit, from which the data will be sent to databanks which can communicate with each other.

This system permits, from the identification by the reader used on the animal' location, obtaining on the computer independently of the reader, data relative to the animal, which are stored in the computer or in the databank or one of the databanks.

The technology of this patent which appears to be theoretically satisfactory, is not so if used in connection with livestock.

In Europe, cattle amounts of the order of 80 million head, distributed over a million properties, and required to be located in a million cattle ranches or in a thousand slaughterhouses.

Those who work in this sector are divided up as follows:
about a million livestock raisers;
about 20,000 transporters;
about 50,000 veterinarians,
not including public or semi-public agents having the job of operating on livestock, each operation being an occurrence in the history of the animal which must be recorded.

It can be considered that on the European roster, between birth and slaughtering, more than 200 million occurrences are to be recorded in the databanks.

It is clear that the technology of the paper passport is completely unsuitable.

The technology of the patent WO99/45761 is an improvement relative to what preceded it; it is however not perfect, particularly as to the recordation in real time of the data in the databanks and the certification of the latter by the database.

Recourse to a computer intermediate between the reader and the database can be a source of double error or disorder.

As to the relationship between the reader and the computer, recourse to dedicated systems, transponders or ports, can also give rise to problems.

Communication between two intermediate computers is possible only by placing in communication with each other the different databases.

This technology, usable onsite for the reader to recognize the animal, is not suitable for the use of data onsite or for its modification onsite.

U.S. Pat. No. 5,324,925 describes a portable terminal with a keyboard memory, an information reader and transmission means to a central unit.

The data on one terminal can be transferred into the memory of another terminal through a central unit by placing in communication the latter with the terminals in question.

This patent, designed for mobile medical personnel making housecalls to sick persons, cannot be transposed to technical sectors relating to animals because placing in communication with the central unit is possible only at a fixed position or a near distance from the central unit.

This excludes use onsite for example by placing in direct communication to terminals to constitute a transfer.

The present invention has for its object to overcome these drawbacks by providing a new process and installation for the identification of animals and the management of information relative to said animals to control the traceability of the animals and the information. The installation permits identifying in a sure manner, rapidly or even automatically, the animals, and facilitates acquiring and transferring information relative to these animals between workers and/or toward a centralized database.

The installation for the identification of animals and for managing the information relative to said animals comprising a centralized database collecting information on said animals bearing an identification adapted to be read by a reading system, the centralized database, the identification and the reading system being connected, is characterized in that:

it comprises one or several autonomous communication systems for the user, said autonomous system integrating the reading system of the identification, the communication means with the centralized databank, a memory integrating information peculiar to the animal and adapted to be duplicated in the centralized databank, direct communication means between at least one autonomous system and another autonomous system without passing through the centralized databank.

Other advantages and characteristics of the invention will become apparent from a reading of the following description, of several embodiments given by way of non-limiting example and illustrated by the accompanying drawings, in which:

FIG. 1 shows the different material elements of the installation.

As shown in FIG. 1, the installation according to the invention comprises at least:

an identification (1) carried by the animal, a system (2) for reading the identification (1), an autonomous system (3) for communication with the user, for processing and storing in a memory (7) information relative to at least one animal, the information being distributed in databases internal to the memory (7) and which are duplicated in the centralized database (4), a connection between the autonomous system (3) and the reading system (2), a centralized database (4) gathering the information on the animals, means (5) for communicating information between the autonomous system (3) and the centralized database (4), means (6) and (6') for communicating between an autonomous system (3) and another autonomous system (3').

The identification (1) of the animal can be constituted by any means for emitting a characteristic signal permitting identifying the animal. This identification can thus for example be an electronic chip, carried by the ear of the animal, implanted beneath the skin of the animal or else ingested (commonly called "bolus"). More simply, the identification can be a visible mark which will be read by a human operator.

This identification can also be constituted by a barcode for example without departing from the scope of the present invention.

The reading system (2) thus depends on the identification used. In the case of an electronic chip emitting a radio signal, the reading system will thus be constituted by a radio frequency receiver. The identification number of an animal is, in France for example, constituted by a ten-digit number as well as two letters to identify the country of origin of the animal.

The principle of emission of an electronic signal corresponding to this number and the remote reading of the number, are within the scope of those skilled in the art.

There can thus automatically be read the identification number of an animal several meters distant or several tens of centimeters.

The autonomous system (3) comprises at least one memory (7) for the storage of information, a module for processing data and an interface with the human user. The module for processing data can be constituted by a microcontroller. The interface for acquiring and reading information can be constituted by any known means. In the case of the use in a cattle raising environment, the use of commands and restitution of the information by vocal means, would be appropriate. In many of these cases, the control of the functions of the autonomous system must be very simple. The autonomous system could thus be provided with a keyboard with a minimum of keys permitting accessing different functions such as reading the identification or connection with the database, for example.

The memory (7) is provided to contain two types of information: dynamic information, erasable and modifiable, relating to the animals and their characteristics, and static information that cannot be erased, concerning the identification of the holder of said memory. The memory thus contains the information in the databases which pertain to it and which are duplicated in the centralized database (4). The information contained in the memory (7) will permit certifying in a uniquely and unfalsifiable manner the identification of the holder or of the user of the autonomous system. This memory (7) can be integrated into the autonomous system or carried on a removable smart card that can be introduced into the system as will be described later.

It is provided that each person having the capability of acting on the animal (owner or holder, veterinarian, transporter or the like) will have in his possession an autonomous system (3) or at least a smart card containing the memory (7) of this system. The autonomous system (3) can be connected to the reading system (2) by any known means.

The centralized database (4) gathers the information concerning the animal of a given group (national livestock, or breed or group of cattle raisers). The owners or holders will transmit to this database certain information concerning their animals. The communication means (5) for information between the autonomous system (3) and the centralized database (4) can be of any type of known communication means, by using the cellular telephone network for example.

It is also possible for proprietors or holders having each an autonomous system (3), to transfer to third parties automatically information contained in the memories (7) of their autonomous systems.

To this end, each autonomous system (3) comprises a communication means (6) permitting transmitting information to at least one other autonomous system (3). The communication means (6) and (6') can for example use a wire connection, radio waves, infrared signals or any other known means.

According to one embodiment of the invention, the reading system (2), the autonomous system (3), the communication means (5) and (6) are integrated into a same housing. They can however be distributed in different housings communicating with each other by wire connection, radio, infrared or any other means.

The invention can also comprise, in the same housing or separately, a device for geographical reference (8) of the GPS type or the like, permitting locating in a certain manner the position at which information is acquired, read, received or exchanged.

The description which follows, of the different steps of the use of the installation, will permit better understanding the invention.

The identification numbers are assigned to animals at birth. Each of these numbers is carried on a loop, for example, in the form of a visible identification and if desired an electronic identification. The owner or holder of the animals fixes the loop through the ear of an animal. It thus identifies the animal in the autonomous system either by manually acquiring the identification number, or thanks to the system of automatic reading of the identification. When the autonomous system has identified the animal, the proprietor or holder can acquire the first information concerning this animal (date of birth, parents of the animal . . . ). These data are stored in the memory of the autonomous system. These data are then transmitted by the autonomous system to the centralized database (4). It is envisageable that this transmission take place in an automatic manner, certified and required as soon as the user enters new information to be transmitted to the database. The transmitted data will relate to information acquired by the proprietor or holder as well as the certified identification of the proprietor or holder contained in the memory (7) of the autonomous system. In return, the database will return information validating that the data contained in the memory of the autonomous system are correctly recorded in the database and supplying them by the same certification.

When a transporter for example takes charge of animals, the autonomous system of the proprietor or holder and the autonomous system of the transporter can communicate with each other. After having identified the animals, the autonomous system of the transporter will receive information relative to these animals contained in the memory of the autonomous system of the proprietor. This transaction will then take place in the centralized database, then, in return, validate it in the memory of each of the two apparatus.

In another case, a potential buyer will be in proximity to an animal. After reading the identification of the animal, the latter communicates with the database from his autonomous system and retrieves information relative to this animal. If this animal interests him, he can then carry out the transaction with the proprietor or holder by causing their respective autonomous systems to communicate.

In fact, several users can communicate with others from the identification of the animal and/or this or that user.

In another case, when it is not possible to communicate immediately with the database, the autonomous system can, after reading the identification of the animal, present information relative to the animal such as are recorded in its memory, or in that of another nearby autonomous system, whilst determining, for each information, if it has or has not been communicated to the database and validated by the latter.

These examples represent only several of the possibilities offered by the installation according to the invention and are in no way limiting.

According to a modification of the installation already mentioned, certain users have an autonomous system constituted by a terminal whose memory is integrated with the apparatus and others have only a smart card accessing the memory relating to animals of which they are in charge, for example. It is in this case possible to envisage several types of autonomous systems:

autonomous systems without a memory but with one or several smart card readers, these systems could for example be disposed in the meeting places of proprietors or holders so that they can carry out their transactions.

Autonomous systems dedicated to a user and having an integrated memory and one or several smart card readers could carry out transactions with users that do not have a personal autonomous system.

The installation according to the invention places at the disposal of all users as many terminals as necessary that can communicate between the animal and the central database or said terminals can communicate between themselves from the identification of the animal in question.

The installation according to the present invention is essentially adapted for the management of animals. However, other uses are envisageable in the management of merchandise, particularly meat or the management of stock for example.

What is claimed is:

1. Installation for identification of animals and for managing information relative to said animals, comprising:
   a reading system;
   an identification readable by the reading system;
   a centralized database for collecting information concerning said animals bearing the identification,
   the centralized database, the identification, and the reading system being operatively connected; and
   at least two autonomous communication systems for users, each of said autonomous communication systems integrating,
   the reading system for reading, for at least one animal, the identification born by the one animal,
   a memory for storing information peculiar to the one animal,
   a selecting means that allows a user selective identification of the one animal as a selected one animal,
   a communication means to communicate to the centralized database the information stored in the memory peculiar to the selected one animal, to receive from the centralized database other information peculiar to the selected one animal and to store received other information from the centralized database in the memory, and
   a direct communication means to directly communicate to another communication system of said at least two autonomous communication systems the information peculiar to the selected one animal, to receive from the another communication system yet other information peculiar to the selected one animal, and to store received yet other information from the another communication system in the memory, the yet other information received by a direct communications means selected by a user of the another communication system,
   the direct communication between the communication system and the another communication system being without passing through the centralized database.

2. Installation according to claim 1, characterized in that the memory (7) of the autonomous system or systems is removable.

3. Installation according to claim 1, characterized in that the memory (7) of each autonomous system contains data corresponding to it and which are duplicated in the centralized databank, these unfalsifiable and unique data are for use for the identification of the user of the autonomous system (3).

4. Installation according claim 3, characterized in that the memory (7) contains both information relative to the user and to the animal.

5. Installation according to claim 1, characterized in that the reading system (2) of the identification (1) uses the principle of radio frequency.

6. Installation according to claim 3, characterized in that the identification (1) is fixed to the ear of the animal.

7. Installation according to claim 3, characterized in that the identification (1) is implanted beneath the skin of the animal.

8. Installation according to claim 3, characterized in that the identification (1) is ingested by the animal.

9. Installation according to claim 1, characterized in that the identification is a visible mark read by a human operator.

10. Installation according to claim 1, characterized in that the memory (7) contains information relating to the animals and information relating to the holder of said memory.

11. Installation according to claim 1, characterized in that the communication means between the autonomous system and the database of the information, use a telephone network.

12. Installation according to claim 1, characterized in that the reading system (2), the autonomous system (3), the communication means (5) and the direct communication means (6) are integrated in a same housing.

13. Installation according to claim 1, further comprising vocal communication means for vocal communication of information between the user and the autonomous system.

14. Installation according to claim 1, further comprising a geographic location global positioning system device.

15. Process for identifying animals and managing information relative to said animals using the installation according to claim 1, comprising a step of reading the identification (1) of the animal and acquiring information relative to said animal in the memory of the autonomous system (3).

16. Process according to claim 15, comprising a further step of transferring acquired information toward the centralized database (4).

17. Process according to claim 15, comprising a further step of returning information from the database (4) to the autonomous system (3), said information validating that the data contained in the memory of the autonomous system (3) are correctly recorded in the database (4).

18. Process according to claim 15, comprising a further step of communicating information between the memories of the two autonomous systems (3).

19. Process according to claim 15, comprising a further step of reading the identification (1) of an animal and recovering information relative to said animal from the database (4) toward the autonomous system (3).

20. Process according to claim 15, comprising a further step of ensuring, automatically, certifiably and necessarily the transmission of new information contained in the autonomous system to the database.

* * * * *